(12) United States Patent
Khavarl et al.

(10) Patent No.: US 7,687,550 B2
(45) Date of Patent: Mar. 30, 2010

(54) COMPOSITION INCLUDING A RADIATION-CURABLE PRE-POLYMER WITH A STABILIZING ADDITIVE COMPRISING METAL PARTICLES

(75) Inventors: Mehrgan Khavarl, Corvallis, OR (US); Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 11/257,930

(22) Filed: Oct. 24, 2005

(65) Prior Publication Data

US 2007/0093567 A1    Apr. 26, 2007

(51) Int. Cl.
*C08F 2/48* (2006.01)
*C08J 3/28* (2006.01)

(52) U.S. Cl. .......................... 522/81; 522/71; 522/104; 522/107; 522/113; 522/120; 522/121; 522/150; 522/153; 522/178; 522/182

(58) Field of Classification Search .................... 522/71, 522/81, 104.107, 113, 120, 121, 150, 153, 522/178, 182
See application file for complete search history.

(56) References Cited

U.S. PATENT DOCUMENTS

| | | | |
|---|---|---|---|
| 5,942,302 A * | 8/1999 | Ha et al. .................... | 428/64.1 |
| 6,801,487 B2 | 10/2004 | Anderson | |
| 7,183,335 B2 * | 2/2007 | Napadensky ................. | 522/71 |
| 2002/0086962 A1 | 7/2002 | Upper | |
| 2003/0108708 A1 | 6/2003 | Anderson et al. | |
| 2004/0063035 A1 * | 4/2004 | Nagano et al. ........... | 430/283.1 |
| 2004/0141385 A1 | 7/2004 | Pettigrew et al. | |
| 2005/0018595 A1 | 1/2005 | Conroy et al. | |
| 2005/0075248 A1 | 4/2005 | Gore et al. | |
| 2005/0089782 A1 | 4/2005 | Kasperchik et al. | |
| 2005/0124715 A1 * | 6/2005 | Cohen et al. ................... | 522/71 |
| 2005/0158500 A1 * | 7/2005 | Kitano et al. .............. | 428/40.1 |
| 2005/0248881 A1 * | 11/2005 | Hayashida et al. .......... | 360/131 |
| 2006/0165942 A1 * | 7/2006 | Miyata et al. .............. | 428/64.4 |

* cited by examiner

Primary Examiner—Sanza L McClendon

(57) ABSTRACT

One embodiment of a composition includes a radiation-curable pre-polymer and at least one stabilizing additive contained in the radiation-curable pre-polymer. The stabilizing additive is configured to reduce shrinkage caused by radiation curing of the radiation-curable pre-polymer.

17 Claims, 4 Drawing Sheets

COMPOSITION INCLUDING A RADIATION-CURABLE PRE-POLYMER WITH A STABILIZING ADDITIVE COMPRISING METAL PARTICLES

BACKGROUND

Optical discs have become an industry standard for data storage in the fields of computers, videos, pictures, games, and music, for example. Optical discs include, but are not limited to, compact discs (CDs), digital video (or versatile) discs (DVDs), and game system discs in a variety of formats. Commercially produced optical discs usually have digital data recorded on one side of the disc and a visual display printed on the other side of the disc.

In some instances, optical discs are created that can store data on both sides of the disc. However, in many cases, it is desirable to limit the optical disc data to a single side of the disc, leaving the other side of the disc for printed text, patterns, or graphics. The printed labeling on a non-data side of an optical disc can include a decorative design, text, or both.

As optical technology has advanced, writeable and rewriteable optical discs and equipment for writing onto the discs have become reasonably priced within the grasp of ordinary consumers. Thus, many consumers currently have the ability to store data on an optical disc using home office equipment.

However, specialized and expensive equipment is required to print labeling on an optical disc. Consequently, the labeling of discs by most consumers is typically limited to printing on separate adhesive labels that are adhered to the non-data side of the disc or handwriting with a marker directly on the disc or an adhesive label.

SUMMARY

One embodiment of a composition includes a radiation-curable pre-polymer and at least one stabilizing additive contained in the radiation-curable pre-polymer. The stabilizing additive is configured to reduce shrinkage caused by radiation curing of the radiation-curable pre-polymer.

BRIEF DESCRIPTION OF THE DRAWINGS

The accompanying drawings illustrate various embodiments of the present compositions, methods, and apparatuses and are a part of the specification. The illustrated embodiments are merely examples of the present compositions, methods, and apparatuses and do not limit the scope of the disclosure.

Throughout the drawings, identical reference numbers designate similar, but not necessarily identical, elements.

DETAILED DESCRIPTION

Writeable and rewritable optical discs include materials that change optical properties (e.g. reflection, refraction, absorption, transmission, diffraction, and scatter) when heated by a focused energy source (e.g. a writing laser). By selectively changing the optical properties of particular points along an optical disc's spiral data track and leaving other areas unaffected, digital data is recorded on the disc that computers and/or audiovisual equipment can read. Some changes in optical properties, such as a change in reflectivity, for example, are also readily visible to consumers and typically indicate that data is stored on the optical disc. Therefore, in addition to storing data on an optical disc, it is also possible to create visible printed patterns or graphic designs on the disc by selectively changing the optical properties of portions of the disc.

Optical discs may be manufactured to include materials configured for creation of visual labels or other visual indicia on the discs when the materials are subjected to heat from a focused energy source. Such materials may be referred to generally as "optically-changing materials," which term means any material or materials that change one or more optical properties when subjected to heat from a focused energy source. Optically-changing materials can be applied to the non-data side of an optical disc, thereby allowing visual labels to be formed when the non-data side of the disc is subjected to a focused energy source.

Optically-changing materials, as well as other materials, may be applied to optical discs in a variety of ways, including, but not limited to, printing radiation-curable lacquers (also referred to as pastes or inks) onto the optical disc. Printed lacquers are typically radiation-cured (e.g., UV-cured) to form layers (i.e., coatings) on the optical disc. Multiple layers may be formed on an optical disc by repeating this process, or by applying coatings in some other fashion.

Before an optically-changing material is applied to an optical disc, an undercoat may be applied to the optical disc. The undercoat may be a sputtered or evaporated metal film or a printed radiation-curable lacquer containing reflective metal flakes (e.g., generally flat metal platelets). The undercoat functions to eliminate, or at least reduce, double images that may otherwise occur when an optical-changing material on the optical disc is imaged.

While the undercoat eliminates or reduces double images, application of the undercoat to the optical disc may affect the structure of the optical disc in a way that might introduce errors into data reading and writing operations. In particular, when the undercoat lacquer is radiation cured on the optical disc, a matrix coating is formed by components of the lacquer bonding together. The bonding of the components causes shrinkage of the coating, which in turn may create residual stress in the undercoat. Also, during the bonding process the elastic modulus of the coating increases, giving rise to a stiffer coating. Mismatches in the physical properties of the optical disc (e.g., a substrate of the optical disc) and the undercoat may also introduce residual stress in the undercoat. Moreover, the undercoat may in some cases act as a moisture barrier preventing the optical disc from absorbing water, which causes differential swelling between the two sides of the optical disc. The residual stresses and/or the differential swelling can cause the optical disc to undesirably bow. Application of other types of coatings to optical discs by radiation-curing may also cause the optical disc to bow in similar fashion.

Bowing of the optical disc may be referred to as radial tilt, which is a measure of the extent (i.e., the angle) of the bowing of the optical disc relative to the clamping surface of the disc. The extent of radial tilt is directly related to error rates associated with reading data from and writing data to optical discs. Radial tilt is especially problematic for optical discs that have relatively tight tilt tolerances, such as digital video (or versatile) discs (DVDs), high-definition DVDs (HD-DVDs), and Blu-ray discs.

The present specification describes a mass media storage device, such as an optical disc, and methods of making and using such an optical disc. In particular, the present specification describes embodiments of compositions that may be applied to an optical disc as a coating that functions to eliminate, or at least reduce, radial tilt that may otherwise result from application of coatings to the optical disc. The compositions may include one or more stabilizing additives, which term refers to materials that generally reduce the amount of shrinkage and/or produce low elastic modulus that occurs during radiation-curing of the coating. By controlling the shrinkage properties of the coating, residual stresses may be reduced. Moreover, the stabilizing additives can further reduce radial tilt by making the coating permeable to moisture. The reduction or elimination of excess radial tilt generally causes reductions in error rates associated with radial tilt.

Stabilizing additives may comprise a variety of different materials, examples of which are described herein. For example, stabilizing additives may include, but are not limited to, dimensionally stable fillers (e.g., solid particles), soluble polymers, soluble co-polymers, reactive diluents, and combinations of any of these materials. Examples of each of these stabilizing additives will be described in greater detail below.

As used in this specification and the appended claims, the term "optical disc" is used broadly to encompass discs for recording music, pictures, video, software, and other digitally recordable data. An optical disc includes, but is not limited to, writable and rewritable storage devices including, but not limited to, DVDs, HD-DVDs, and Blu-ray discs, in various formats. The embodiments disclosed herein are especially applicable for reducing excess radial tilt in optical discs having relatively tight tilt tolerances (e.g., tilt tolerances less than approximately plus or minus 0.7 degrees). Such types of optical discs include, but are not limited to, DVDs, HD-DVDs, and Blu-ray discs.

"Radiation curing" means curing a material (e.g., causing molecules of a pre-polymer to react to form a polymer) by subjecting the material to radiation energy such as UV radiation or an electron beam, for example. "Pre-polymer" means an intermediate building block of molecules configured to eventually form a polymer or resin. Pre-polymers may also be referred to as monomers and "oligomers." "Radiation-curable pre-polymer" means a pre-polymer that is curable by exposure to radiation energy.

Figure 1:
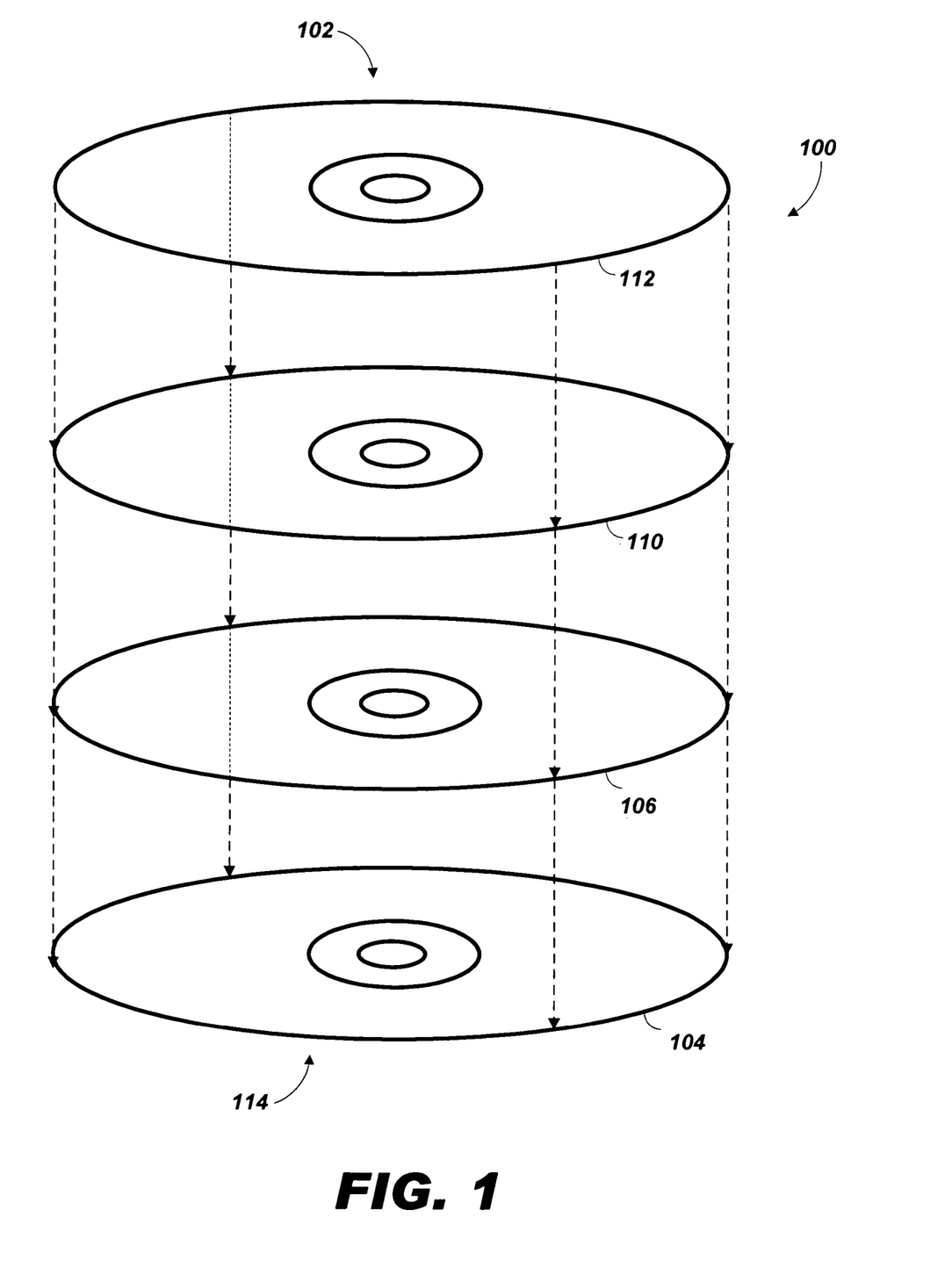
FIG. 1 is an exploded view of an optical disc, according to one embodiment.

Turning now to the figures, an in particular to FIG. 1, an exploded view of an optical disc (100) is shown according to one embodiment of the principles described herein. The optical disc (100) includes a label side (102) designed to facilitate labeling thereon by the application of focused energy. As shown in FIG. 1, the label side (102) of the optical disc (100) may include a substrate (104), an undercoat layer (106), a thermochromic layer (110), and an optically transparent layer (112), arranged as shown in FIG. 1.

The optical disc (100) may comprise a polycarbonate plastic material or other material suitable for use as an optical data storage medium. The optical disc (100) may be formed using a known injection molding process. The substrate (104) of the optical disc (100) refers to a surface of the optical disc (100). Accordingly, in some embodiments, the substrate (104) comprises a polycarbonate plastic material.

The thermochromic layer (110) may include thermochromic materials that change optical properties (e.g., optical density) when subjected to heat from a suitable energy source such as, for example, IR radiation, UV radiation, or visible light. Changes in the optical properties of the thermochromic layer (110) may be visible to the human eye and may be expressed in a variety of different colors, depending on the thermochromic material. In one embodiment, the thermochromic layer (110) includes leuco dye, a material known to change color with the application of heat, or in presence of an activator (i.e., a developer). Leuco dyes used in some embodiments may comprise fluoran-based compounds. In other embodiments, the thermochromic layer (110) may include other materials known to change color with the application of heat (i.e., color-changing materials).

The thermochromic layer (110) may include one or more activator substances, which are configured to react with the color-changing material (e.g., leuco dye) to cause the color-changing material to alter its chemical structure and change or acquire color. By way of example only, activators may include phenolic or other proton-donating species that can effect this change.

The thermochromic layer (110) may further include one or more radiation-absorbing materials configured to act as antennae that readily absorb one or more specific wavelengths of marking radiation. In some embodiments, the radiation-absorbing material comprises an infrared (IR) dye.

The thermochromic layer (110) may be in the form of a matrix such as radiation-cured acrylate oligomers and monomers. A particular embodiment of the thermochromic layer (110) includes a radiation-cured polymer matrix, such as, for example, a matrix formed from radiation-curable pre-polymers, which may be applied to the optical disc (100) and radiation cured to form the thermochromic layer (110). Examples of suitable radiation-curable pre-polymers include, but are not limited to, UV-curable components such as polymerizable acrylates and methacrylates (etheracrylates, urethane acrylates, epoxide acrylates, polyester acrylates, and acrylic acrylates), cellulose acetate, cellulose acetate-butyrate, polyimides, polyesters, polystyrene-maleic anhydride derivatives, and polyvinyl alcohol, other acrylate derivatives such as isobornyl acrylate, dicyclopentadienyl methacrylate, tetrahydrofurfuryl acrylates, aliphatic-chain acrylates and diacrylates, phenoxyethyl acrylates, caprolactone acrylate, neopentyl glycol acrylates, cyclohexane dimethanol acrylate, oligomers and monomers, with a photo package. A photo package may include a light-absorbing species, which initiates reactions for curing of a lacquer, such as, for example, benzophenone derivatives.

The thermochromic layer (110) may be formed using any of the compositions and methods described in U.S. Patent Publication No. 2005/0075248 by Gore et al., filed Oct. 22, 2004, and entitled "Compositions, Systems, and Methods for Imaging onto a Substrate," the entire contents of which are hereby incorporated by reference.

The thermochromic layer (110) may be covered with the optically transparent layer (112) to protect the thermochromic layer (110) from scratches or other damage. Preferably, the optically transparent layer (112) will not absorb energy of wavelengths associated with energy sources (e.g., lasers) typically used to read, write, and/or label optical discs. The optically transparent layer (112) may comprise, for example, a clear polycarbonate material, or another protective material. The optically transparent layer (112) may be spin-coated onto the thermochromic layer (110).

The inclusion of the optically transparent layer (112) in the embodiment shown in FIG. 1 is not limiting. According to other embodiments, there is no optically transparent layer (112) disposed over the thermochromic layer (110).

It will be understood that the opposite of the label side (102) of the optical disc (100) will normally be a data side (114), which is identified as the underside of the substrate (104) in FIG. 1. The data side (114) may be fabricated according to conventional methods that are well known to those of skill in the art having the benefit of this disclosure. The data side (114) therefore may include all of the layers typical of writable and rewritable optical discs in various formats. However, according to some embodiments, there may be two label sides (102) and no data side (114). According to embodiments with two label sides (102), only visual indicia (e.g., printed patterns, text, and graphical designs) may be created on the optical disc (100), and no digital data may be recorded.

As shown in FIG. 1, the undercoat layer (106) may be deposited between the substrate (104) and the thermochromic layer (110). The undercoat layer (106) may include reflective flakes (e.g., generally flat metal platelets), which function to eliminate, or at least reduce, double images that may otherwise occur when the thermochromic layer (110) of the optical disc (100) is imaged. The undercoat layer (106) may comprise a polymer matrix formed by applying and radiation-curing (e.g., UV-curing) a radiation-curable pre-polymer lacquer on the substrate (104). The radiation-curable pre-polymer lacquer (also referred to as an ink or a paste) may include one or more stabilizing additives for reducing shrinkage when the radiation-curable pre-polymer lacquer is cured on the substrate (104).

Figure 2:
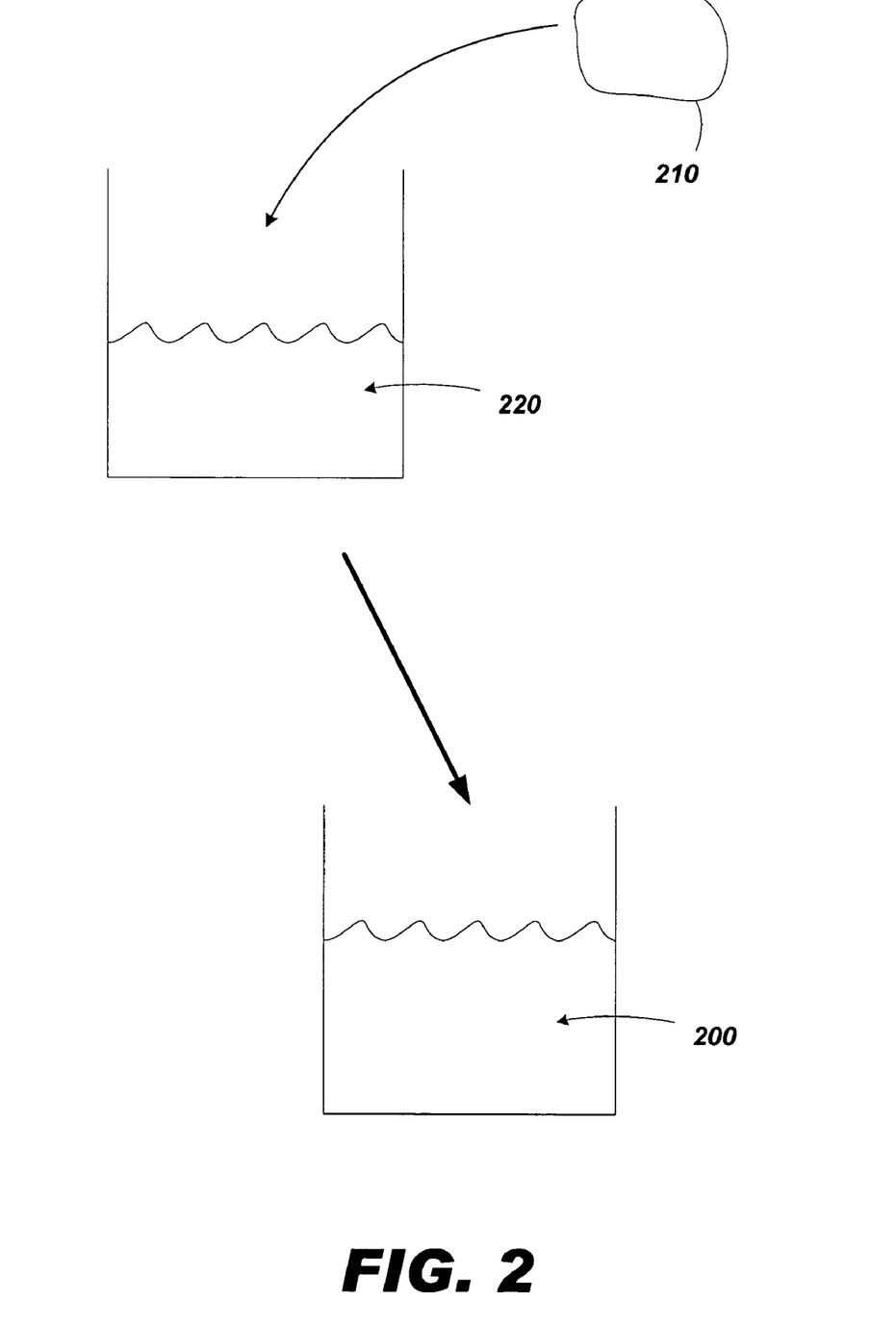
FIG. 2 illustrates a preparation of a composition having a stabilizing additive, according to one embodiment.

FIG. 2 illustrates an example of a radiation-curable pre-polymer lacquer (200) (also referred to as "the composition (200)") being formed by combining a stabilizing additive (210) with a radiation-curable pre-polymer (220). The radiation-curable pre-polymer (220) is preferably in a form suitable for application and radiation-curing on the substrate (FIG. 1; 104) of the optical disc (FIG. 1; 100). Examples of suitable radiation-curable pre-polymers (220) include, but are not limited to, UV-curable matrices such as polymerizable acrylates and methacrylates (etheracrylates, urethane acrylates, epoxide acrylates, polyester acrylates, and acrylic acrylates), cellulose acetate, cellulose acetate-butyrate, polyimides, polyesters, polystyrene-maleic an hydride derivatives, polyvinyl alcohol, other acrylate derivatives such as isobornyl acrylate, dicyclopentadienyl methacrylate, tetrahydrofurfuryl acrylates, aliphatic-chain acrylates and diacrylates, phenoxyethyl acrylates, caprolactone acrylate, neopentyl glycol acrylates, cyclohexane dimethanol acrylate, oligomers, and monomers.

Although FIG. 2 shows one stabilizing additive (210), this is for illustration only and not intended to be limiting. One or more stabilizing additives (210) may be added to the radiation-curable pre-polymer (220). Stabilizing additives (210) may comprise a variety of different materials, including, but not limited to, dimensionally stable fillers, soluble polymers, soluble co-polymers, reactive diluents, and combinations of any of these materials. These materials may be added to the radiation-curable pre-polymer (220) to form the radiation-curable pre-polymer lacquer (200), which may be applied to the substrate (FIG. 1; 104). The radiation-curable pre-polymer lacquer (200) can then be radiation-cured to form the undercoat layer (FIG. 1; 106) on the substrate (FIG. 1; 104), as mentioned above. Several examples of suitable stabilizing additives (210) will now be described.

In some embodiments, the stabilizing additives (210) may comprise organic or inorganic fillers that are dimensionally stable when subjected to radiation-curing energy (e.g., thermal or photo UV-curing energy). The dimensionally stable fillers help reduce shrinkage of the radiation-curable pre-polymer lacquer (200) by occupying space during radiation curing. The spaces occupied by the fillers can also help increase the permeability of the undercoat (FIG. 1; 106) formed by the radiation-curable pre-polymer lacquer (200). The fillers may include solid particles. Examples of suitable dimensionally-stable fillers include, but are not limited to, metal particles or flakes such as Metallure™ aluminum, for example. The metal particles may be in the form of a powder (e.g., an aluminum powder). In one embodiment, the radiation-curable pre-polymer lacquer (200) includes metal particles making up approximately two percent to five percent of the weight (i.e., 2-5 wt %) of the lacquer (200). Metallure™ is a trademarked product of Avery-Dennison Company. Other solid fillers that may be used as stabilizing additives include, but are not limited to, TiO2, Al2O3, SiO2, ZnO, ZnSO4, but a higher wt % must be used to produce enough hiding power to prevent double-image. A combination of two or more fillers could be used depending on the desired effect. Concentrations of 10-45 wt % are not uncommon.

In some embodiments, the stabilizing additives (210) may comprise one or more polymers that are soluble, or at least partially soluble, in the radiation-curable pre-polymer (220). As used herein, "soluble polymer" means any polymer, co-polymer, or combination thereof that is soluble, or at least partially soluble, in the radiation-curable pre-polymer (220). "Soluble polymer" may also refer to a combination of soluble and partially soluble polymers. The soluble polymers may crystallize during radiation-curing to form crystallites in the undercoat layer (110). The crystallites can reduce shrinkage and increase permeability by occupying space in the matrix formed by radiation curing the radiation-curable pre-polymer lacquer (200).

Examples of suitable soluble polymers include, but are not limited to, methylmethacrylate-butylacrylate co-polymer, polymethylmethacrylate, polybutylacrylate, and a block copolymer containing both polymethylmehtacrylate and ploybutylacrylate polymers. In some embodiments, the soluble or partially soluble polymers make up approximately 0.1 percent to thirty percent of the weight (i.e., 0.1-30 wt %) of the radiation-curable pre-polymer lacquer (200). Solubility of the 'soluble' polymer is highly dependent on the solvent power of the monomers and oligomers used in the coating. A list of other soluble polymers may include, but is not limited to, Polyethylene oxide, polyethylene glycol, Polyvinylalcohol, and polybutadiene.

In some embodiments, the stabilizing additives (210) may comprise one or more reactive diluents, which may be included in the radiation-curable pre-polymer lacquer (200) to reduce crosslink density of the undercoat layer (FIG. 1; 106). Crosslink density refers to the density of bonds that tie polymer molecules together into a matrix. The crosslink density is typically determined during radiation curing of the radiation-curable pre-polymer lacquer (200). Reactive diluents function to reduce the density of the bonds that form between molecules of the radiation-curable pre-polymer lacquer (200) during radiation curing. By reducing the crosslink density of the matrix of the undercoat layer (FIG. 1; 106), the undercoat layer (FIG. 1; 106) incurs less residual stresses because shrinkage is reduced during radiation curing. The crosslink density also has a dramatic effect on the elastic modulus of the matrix.

Examples of suitable reactive diluents include, but are not limited to, mono-functional acrylates and methacrylates such as isodecyl acrylate. In some embodiments, one or more reactive diluents make up approximately 0.1 percent to thirty percent of the weight (i.e., 0.1-30 wt %) of the radiation-curable pre-polymer lacquer (200). Other reactive diluents may include, but are not limited to, isobornyl acrylate, dicyclopentadienyl methacrylate, tetrahydrofurfuryl acrylates, aliphatic-chain acrylates and diacrylates, phenoxyethyl acrylates, caprolactone acrylate, neopentyl glycol acrylates, and cyclohexane dimethanol acrylate.

In some embodiments, the stabilizing additives (210) may comprise combinations of the stabilizing additives (210) described above. By way of example, dimensionally-stable fillers may be used in combination with soluble polymers. In some embodiments, for example, the radiation-curable pre-polymer lacquer (200) includes a combination of metal particles or flakes (e.g., Metallure™ aluminum powder) making up approximately 0.1 percent to twenty percent of the weight (i.e., 0.1-20 wt %) of the radiation-curable pre-polymer lacquer (200), and a soluble polymer (e.g., methylmehtacrylate-butylacrylate co-polymer) making up approximately 0.1 percent to fifty percent of the weight (i.e., 0.1-50 wt %) of the radiation-curable pre-polymer lacquer (200). Other embodiments may include combinations of metal particles and soluble polymers in different weight ratios. In some embodiments, for example, the radiation-curable pre-polymer lacquer (200) includes a combination of metal particles or flakes making up approximately two percent to five percent of the weight (i.e., 2-5 wt %) of the radiation-curable pre-polymer lacquer (200), and a soluble polymer (e.g., methylmehtacrylate-butylacrylate co-polymer) making up approximately 0.1 percent to fifty percent of the weight (i.e., 0.1-50 wt %) of the radiation-curable pre-polymer lacquer (200). In some embodiments, the radiation-curable pre-polymer lacquer (200) includes a combination of metal particles or flakes making up approximately 0.1 percent to twenty percent of the weight (i.e., 0.1-20 wt %) of the radiation-curable pre-polymer lacquer (200), and a soluble polymer (e.g., methylmehtacrylate-butylacrylate co-polymer) making up approximately five percent to twenty percent of the weight (i.e., 5-20 wt %) of the radiation-curable pre-polymer lacquer (200).

Other combinations of stabilizing additives (210) are also anticipated. By way of example, the stabilizing additives (210) may include combinations of dimensionally stable fillers and reactive diluents, or combinations of soluble polymers and reactive diluents. In some embodiments, for example, the radiation-curable pre-polymer lacquer (200) includes a combination of metal (e.g., aluminum) particles or flakes making up approximately two to five volume percent of the radiation-curable pre-polymer lacquer (200), and a reactive diluent (e.g., isodecyl acrylate) making up approximately five percent to thirty percent of the weight (i.e., 5-30 wt %) of the radiation-curable pre-polymer lacquer (200).

In other embodiments, stabilizing additives (210) of other forms or combinations may be included in the radiation-curable pre-polymer lacquer (200) to change its shrinkage property. The specific form and combination of the stabilizing additives (210) contained in the radiation-curable pre-polymer lacquer (200) should be configured to reduce shrinkage of the radiation-curable pre-polymer lacquer (200) due to radiation-curing, which will in turn reduce the residual stresses and radial tilt of the optical disc (FIG. 1; 100).

Figure 3:
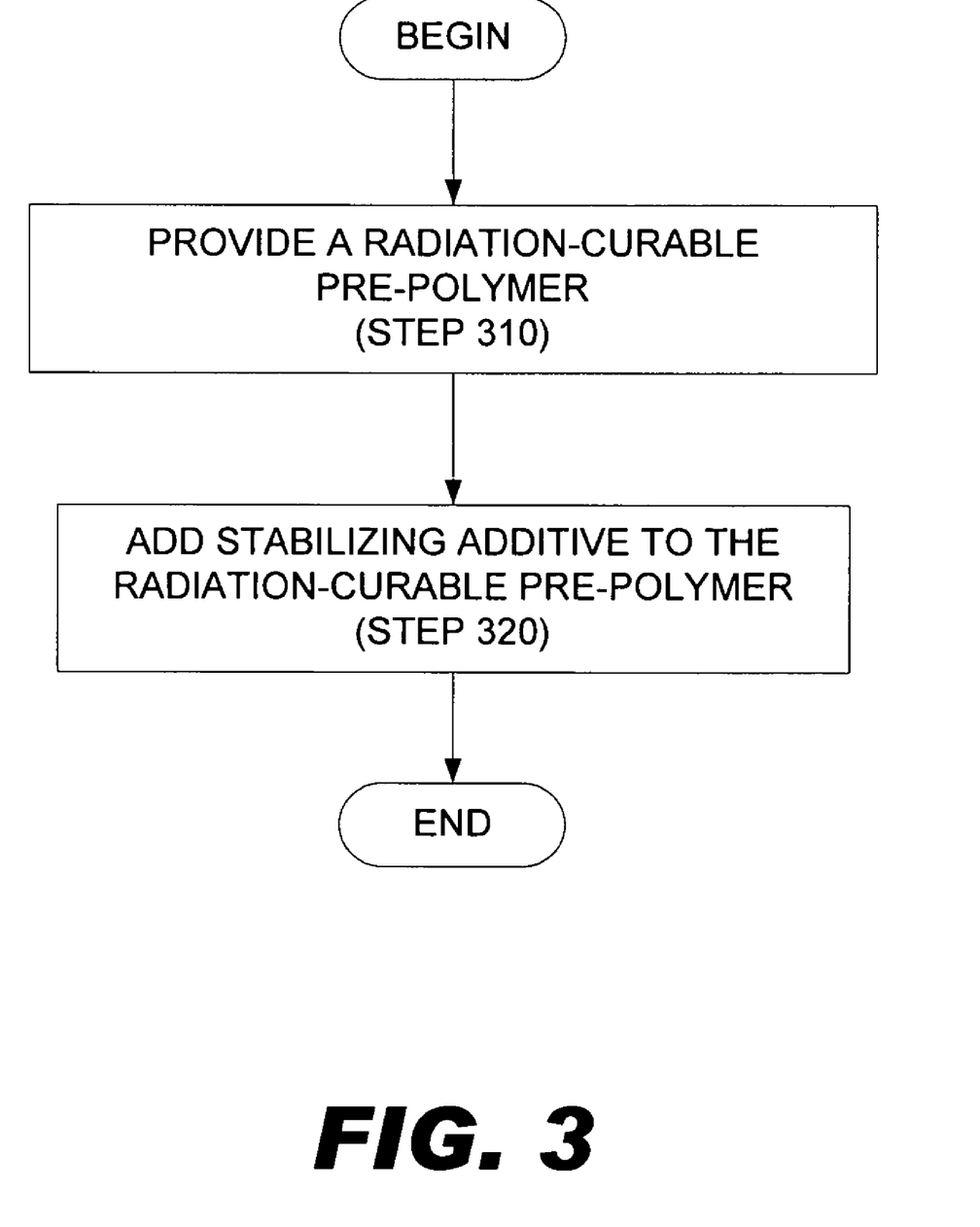
FIG. 3 is a flowchart illustrating an example of a method of making a composition for forming an undercoat layer of the optical disc of FIG. 1, according to one embodiment.

FIG. 3 is a flowchart illustrating an example of a method of making a radiation-curable pre-polymer lacquer suitable for application to an optical disc by radiation curing, according to one embodiment. While FIG. 3 shows a number of steps of one method, in other embodiments, some of the steps may be omitted, additional steps may be performed, and/or the steps may be performed in a different order than shown.

The method begins by providing a radiation-curable pre-polymer (step 310). The radiation-curable pre-polymer may be in any of the forms described above, including any suitable form of the radiation-curable pre-polymer (220) of FIG. 2.

At least one stabilizing additive is added to the radiation-curable pre-polymer (step 320). The stabilizing additive may comprise any of the stabilizing additives (210) of FIG. 2 and may be added using any suitable techniques. For example, the stabilizing additive may be dissolved and/or mixed into the radiation-curable pre-polymer.

The addition of one or more stabilizing additives to the radiation-curable pre-polymer forms a lacquer (e.g., the radiation-curable pre-polymer lacquer (200) of FIG. 2) configured for application and radiation curing on a substrate such as a substrate of an optical disc. As mentioned above, the stabilizing additive is configured to reduce shrinkage caused by radiation curing the radiation-curable pre-polymer lacquer on the substrate.

Figure 4:
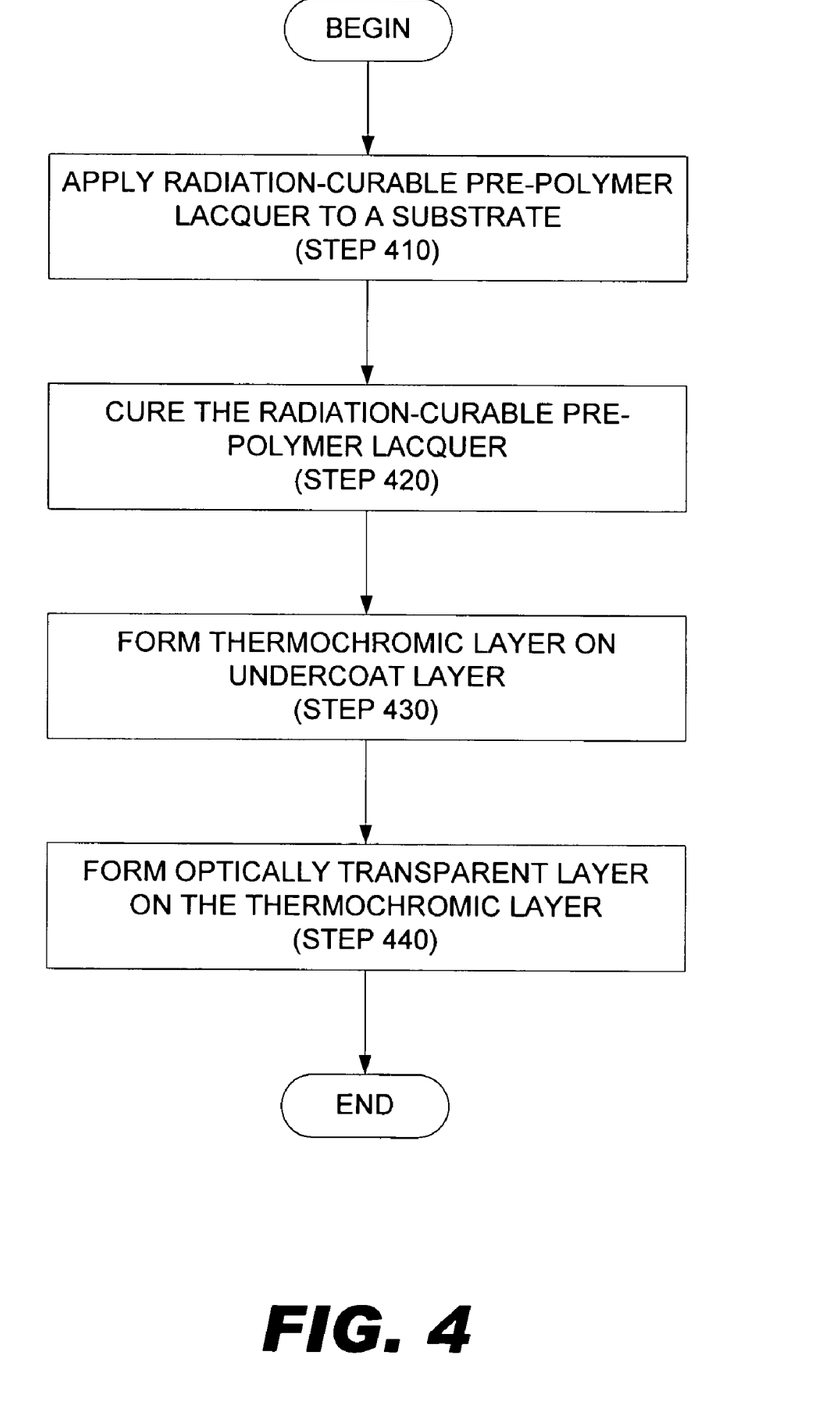
FIG. 4 is a flowchart illustrating an example of a method of using the composition formed in accordance with the method of FIG. 2 to form an undercoat layer of the optical disc of FIG. 1, according to one embodiment.

FIG. 4 is a flowchart illustrating an example of a method of using a radiation-curable pre-polymer lacquer to form an optical disc, such as the optical disc (100) of FIG. 1, accordingly to one embodiment. While FIG. 4 shows a number of steps of one method, in other embodiments, some of the steps may be omitted, additional steps may be performed, and/or the steps may be performed in a different order than shown.

The method begins by applying a radiation-curable pre-polymer lacquer to a substrate (step 410). The lacquer may be printed on the substrate, or may be applied by another known process. The radiation-curable pre-polymer lacquer may include one or more of the stabilizing additives (210) of FIG. 2.

The radiation-curable pre-polymer lacquer is cured on the substrate (step 420). The curing may be performed using a known radiation curing process, such as a UV-curing process. The curing of the radiation-curable pre-polymer lacquer on the substrate forms a coating, such as the undercoat layer (106) of FIG. 1.

Additional layers may be similarly applied to the optical disc. For example, a thermochromic layer is formed over an undercoat layer (step 430). This step may be performed by printing and radiation-curing a thermochromic lacquer to form the thermochromic layer (e.g., the thermochromic layer (110) of FIG. 1). The thermochromic layer may be formed on the optical disc using any of the techniques described in U.S. Patent Publication No. 2005/0075248 by Gore et al., filed Oct. 22, 2004, and entitled "Compositions, Systems, and Methods for Imaging onto a Substrate," the entire contents of which have been incorporated by reference.

An optically transparent layer is formed over the thermochromic layer (step 440). This step, which is optional, may be performed using a known technique.

In conclusion, the present compositions, methods, and apparatuses produce reduced error rates associated with reading data from and writing data to optical storage media. Stabilizing additives are used to reduce residual stresses that may be caused applying a coating to an optical disc. By including stabilizing additives in a radiation-curable lacquer used to form the coating, the shrinkage properties of the lacquer are changed to reduce the shrinkage incurred by the lacquer during radiation curing. This generally reduces the bowing (i.e., radial tilt) of the optical disc to which the lacquer is applied and cured.

The preceding description has been presented only to illustrate and describe the present compositions, methods, and apparatuses. It is not intended to be exhaustive or to limit the disclosure to any precise form disclosed. Many modifications and variations are possible in light of the above teaching. For example, although particular embodiments of the present compositions, methods, and apparatuses have been described in relation to optical disc implementations, the present compositions, methods, and apparatuses may be applied to other forms of optical storage media, or to substrates of objects having chemical properties similar to substrates of optical discs. It is intended that the scope of the disclosure be defined by the following claims.

What is claimed is:

1. A composition, comprising:
   a radiation-curable pre-polymer; and
   at least one stabilizing additive contained in said radiation-curable pre-polymer, said at least one stabilizing additive comprising metal particles that are sufficiently dimensionally stable so as to reduce shrinkage caused by radiation curing of said radiation-curable pre-polymer.

2. The composition of claim 1, wherein said metal particles making up approximately two percent to five percent of the weight (2-5 wt %) of the composition.

3. The composition of claim 1, wherein said at least one stabilizing additive comprises aluminum flakes.

4. The composition of claim 1, wherein said at least one stabilizing additive further comprises at least one soluble polymer that is at least partially soluble in said pre-polymer and crystallizes during radiation curing of said radiation-curable pre-polymer.

5. The composition of claim 4, wherein said at least one stabilizing additive comprises at least one soluble polymer making up approximately 0.1 percent to thirty percent of the weight (0.1-30 wt %) of the composition.

6. The composition of claim 4, wherein said at least one stabilizing additive comprises at least one of a methylmethacrylate-butylacrylate co-polymer, a polymethylmethacrylate polymer, a polybutylacrylate polymer, and a block co-polymer containing both a polymethylmehtacrylate polymer and a ploybutylacrylate polymer.

7. A composition, comprising:
   a radiation-curable pre-polymer; and
   at least one stabilizing additive contained in said radiation-curable pre-polymer, said at least one stabilizing additive reducing shrinkage caused by radiation curing of said radiation-curable pre-polymer;
   wherein said at least one stabilizing additive comprises at least one reactive diluent that reduces crosslink density during radiation curing of said radiation-curable pre-polymer, said at least one reactive diluent comprising isodecyl acrylate.

8. The composition of claim 7, wherein said at least one stabilizing additive comprises at least reactive diluent making up approximately 0.1 percent to thirty percent of the weight (0.1-30 wt %) of the composition.

9. The composition of claim 7, wherein said at least one stabilizing additive comprises at least one of a mono-functional acrylate and a methacrylate.

10. The composition of claim 1, wherein said at least one stabilizing additive comprises a combination of said metal particles that are dimensionally stable during radiation curing, and either a soluble polymer that crystallizes during radiation curing or a reactive diluent that reduces crosslink density during radiation curing.

11. The composition of claim 1, wherein said at least one stabilizing additive comprises a combination of metal particles making up approximately 0.1 percent to twenty percent of the weight (0.1-20 wt %) of the composition, and a soluble polymer making up approximately 0.1 percent to fifty percent of the weight (0.1-50 wt %) of the composition.

12. The composition of claim 1, wherein said at least one stabilizing additive comprises a combination of metal particles making up approximately two percent to five percent of the weight (2-5 wt %) of the composition, and a soluble polymer making up approximately 0.1 percent to fifty percent of the weight (0.1-50 wt %) of the composition.

13. The composition of claim 1, wherein said at least one stabilizing additive comprises a combination of metal particles making up approximately 0.1 percent to twenty percent of the weight (0.1-20 wt %) of the composition, and a soluble polymer making up approximately five percent to twenty percent of the weight (5-20 wt %) of the composition.

14. The composition of claim 1, wherein said at least one stabilizing additive comprises a combination of an aluminum powder and a methylmehtacrylate-butylacrylate co-polymer.

15. The composition of claim 1, wherein said at least one stabilizing additive comprises a combination of metal particles making up approximately two to five volume percent of the composition, and a reactive diluent making up approximately five percent to thirty percent of the weight (5-30 wt %) of the composition.

16. The composition of claim 1, wherein said at least one stabilizing additive comprises a combination of an aluminum powder and an isodecyl acrylate.

17. The composition of claim 1, wherein said radiation-curable pre-polymer having said at least one stabilizing additive is in the form of a lacquer configured to be applied to and radiation cured on a substrate of an optical disc.

* * * * *

UNITED STATES PATENT AND TRADEMARK OFFICE
CERTIFICATE OF CORRECTION

PATENT NO. : 7,687,550 B2  Page 1 of 1
APPLICATION NO. : 11/257930
DATED : March 30, 2010
INVENTOR(S) : Mehrgan Khavari et al.

It is certified that error appears in the above-identified patent and that said Letters Patent is hereby corrected as shown below:

On the title page, item (75), Inventors, in column 1, line 1, delete "Mehrgan Khavarl" and insert -- Mehrgan Khavari --, therefor.

In column 9, line 32, in Claim 6, delete "polymethylmehtacrylate" and insert -- polymethylmethacrylate --, therefor.

In column 9, line 33, in Claim 6, delete "ploybutylacrylate" and insert -- polybutylacrylate --, therefor.

In column 10, line 32, in Claim 14, delete "methylmehtacrylate-butylacrylate" and insert -- methylmethacrylate-butylacrylate --, therefor.

Signed and Sealed this

Seventh Day of September, 2010

David J. Kappos
*Director of the United States Patent and Trademark Office*